(12) United States Patent
Ansorge

(10) Patent No.: US 8,128,155 B2
(45) Date of Patent: Mar. 6, 2012

(54) CONSTRUCTION MACHINE

(75) Inventor: Dieter Ansorge, Rot a.d. Rot (DE)

(73) Assignee: Liebherr-Hydraulikbagger GmbH, Kirchdorf (DE)

( * ) Notice: Subject to any disclaimer, the term of this patent is extended or adjusted under 35 U.S.C. 154(b) by 51 days.

(21) Appl. No.: 12/599,165

(22) PCT Filed: May 7, 2008

(86) PCT No.: PCT/EP2008/003665
§ 371 (c)(1),
(2), (4) Date: Nov. 6, 2009

(87) PCT Pub. No.: WO2008/135284
PCT Pub. Date: Nov. 13, 2008

(65) Prior Publication Data
US 2010/0301634 A1 Dec. 2, 2010

(30) Foreign Application Priority Data

May 7, 2007 (DE) .................... 20 2007 006 500 U

(51) Int. Cl.
*B62D 33/077* (2006.01)
(52) U.S. Cl. .............. 296/190.03; 296/190.07
(58) Field of Classification Search ............ 296/187.03, 296/190.03, 190.07; 180/89.12, 89.13
See application file for complete search history.

(56) References Cited

U.S. PATENT DOCUMENTS

| | | | | |
|---|---|---|---|---|
| 4,095,839 A * | 6/1978 | Lawrence et al. | ........ | 296/190.03 |
| 5,984,036 A * | 11/1999 | Higuchi et al. | ............ | 180/89.12 |
| 6,810,980 B2 * | 11/2004 | Jo et al. | ..................... | 180/89.13 |
| 7,364,223 B2 * | 4/2008 | Mori et al. | ............... | 296/190.07 |
| 7,828,371 B2 * | 11/2010 | Murakami | ............... | 296/190.03 |
| 2003/0111281 A1 | 6/2003 | Jo et al. | | |
| 2004/0245806 A1 * | 12/2004 | Mori et al. | ............... | 296/187.03 |
| 2009/0127888 A1 * | 5/2009 | Tsukamoto et al. | ...... | 296/190.03 |
| 2009/0256393 A1 * | 10/2009 | Kim | ......................... | 296/190.03 |
| 2010/0176624 A1 * | 7/2010 | Kamimae | ................ | 296/190.08 |
| 2010/0187860 A1 * | 7/2010 | Tanaka et al. | ............ | 296/190.08 |
| 2010/0320802 A1 * | 12/2010 | Miyasaka | ................ | 296/190.03 |
| 2011/0025096 A1 * | 2/2011 | Yamamoto et al. | ...... | 296/190.03 |

FOREIGN PATENT DOCUMENTS

| | | |
|---|---|---|
| DE | 10239724 | 7/2003 |
| EP | 1454821 | 9/2004 |
| EP | 1645493 | 4/2006 |
| EP | 1728930 | 12/2006 |
| JP | 10-292434 | 11/1998 |

(Continued)

OTHER PUBLICATIONS

Abstract for Japanese Patent Publication 2007-069724 (Tetsushi), printed from the JPO website Mar. 26, 2011.*

*Primary Examiner* — Jason S Morrow
(74) *Attorney, Agent, or Firm* — Dilworth & Barrese, LLP.

(57) ABSTRACT

The present invention relates to a construction machine having an operator's cabin whose cabin structure which is made reinforced serves the protection of the operator, with the operator's cabin being supported via a base plate at an operator's cab frame at the machine side. In accordance with the invention, the stiffness of the cabin structure is larger than that of the base plate and/or of the operator's cab frame at least with respect to a lateral force engagement so that in a load case first the base plate and/or the operator's cab frame are deformed.

14 Claims, 8 Drawing Sheets

FOREIGN PATENT DOCUMENTS

| | | |
|---|---|---|
| JP | 2000-234352 | 8/2000 |
| JP | 2004-330808 | 11/2004 |
| JP | 2006-348509 | 12/2006 |
| JP | 2007-055445 | 3/2007 |
| JP | 2007-069724 | 3/2007 |
| JP | 2007-069807 | 3/2007 |
| WO | 2007/010808 | 1/2007 |

* cited by examiner

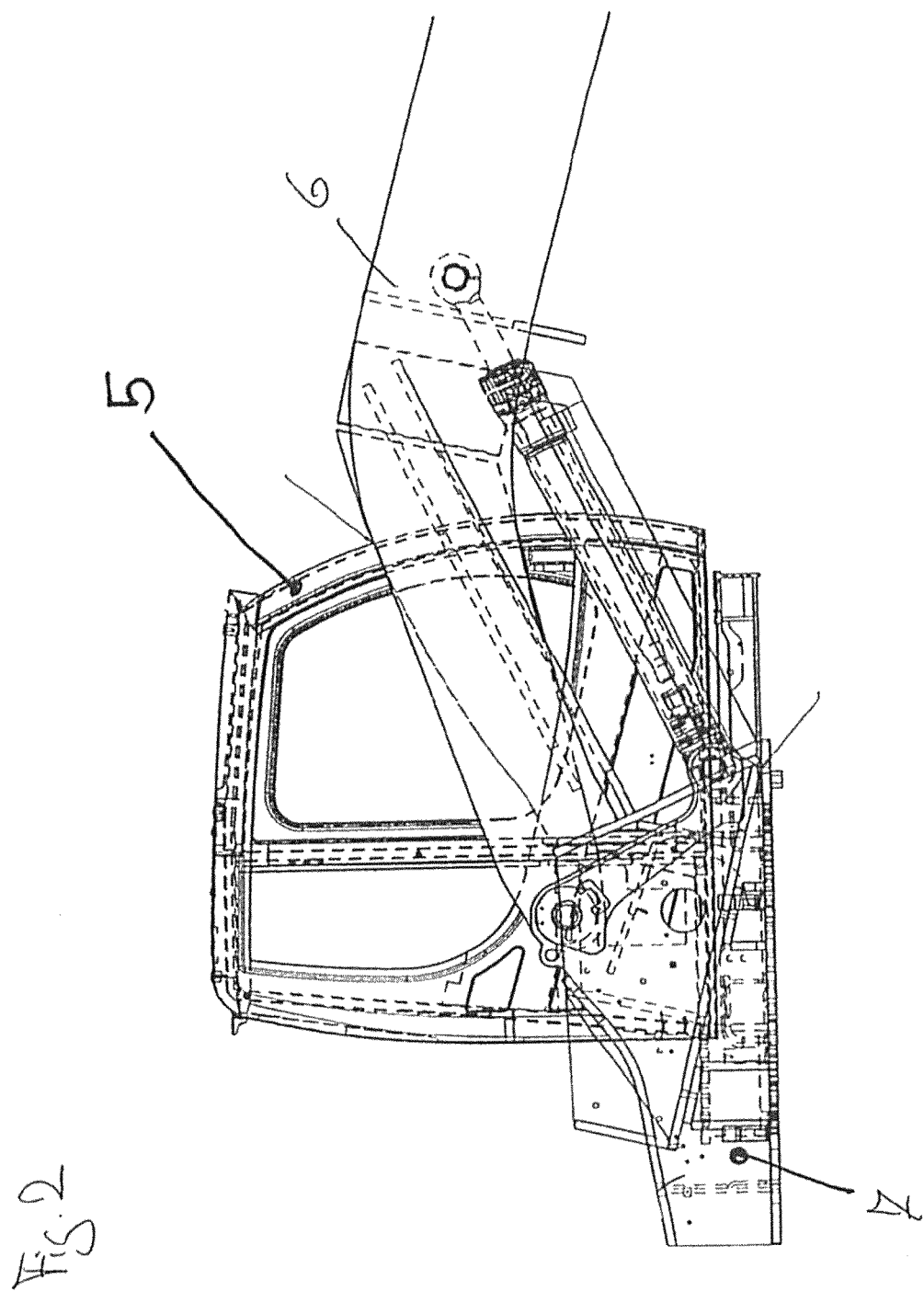

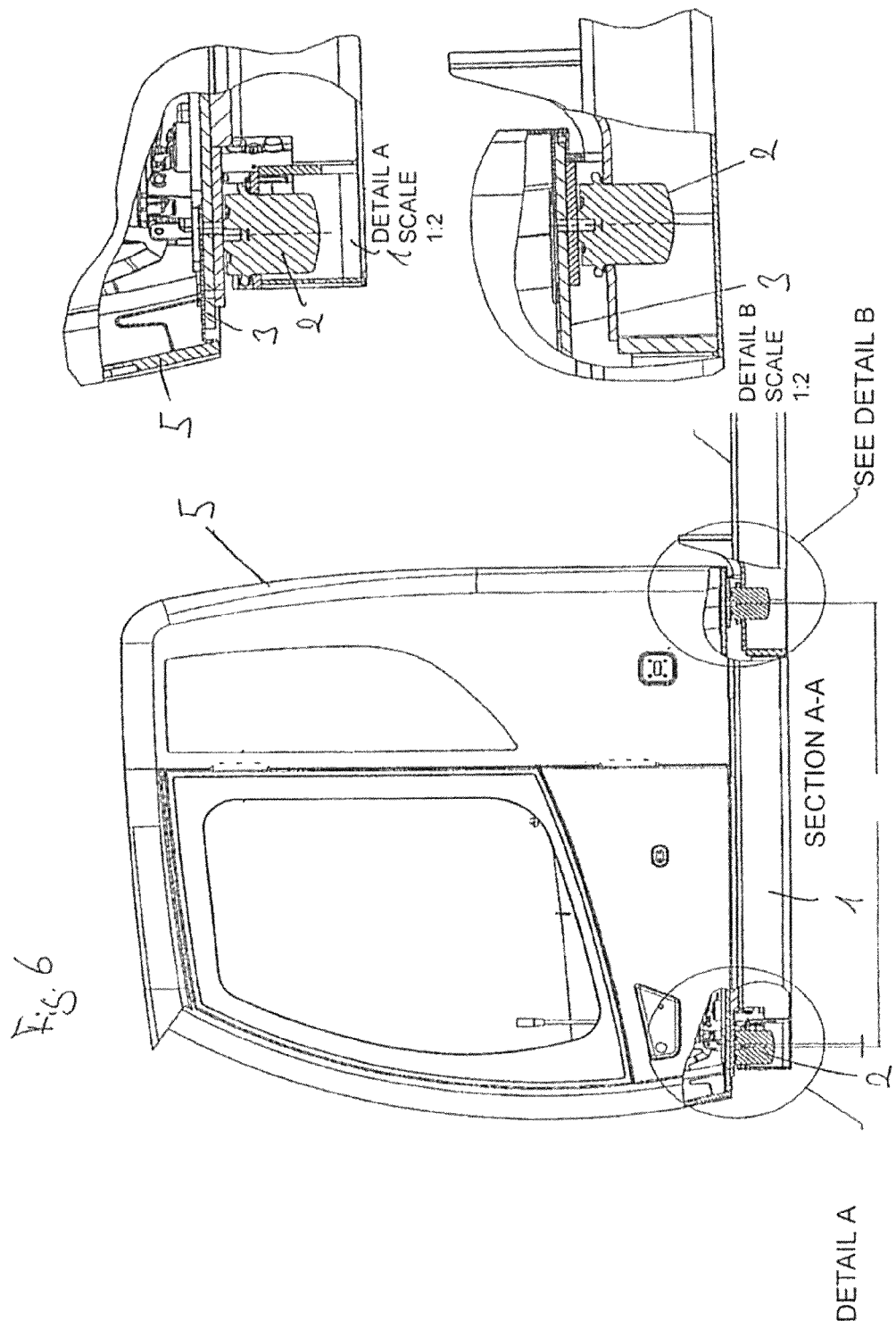

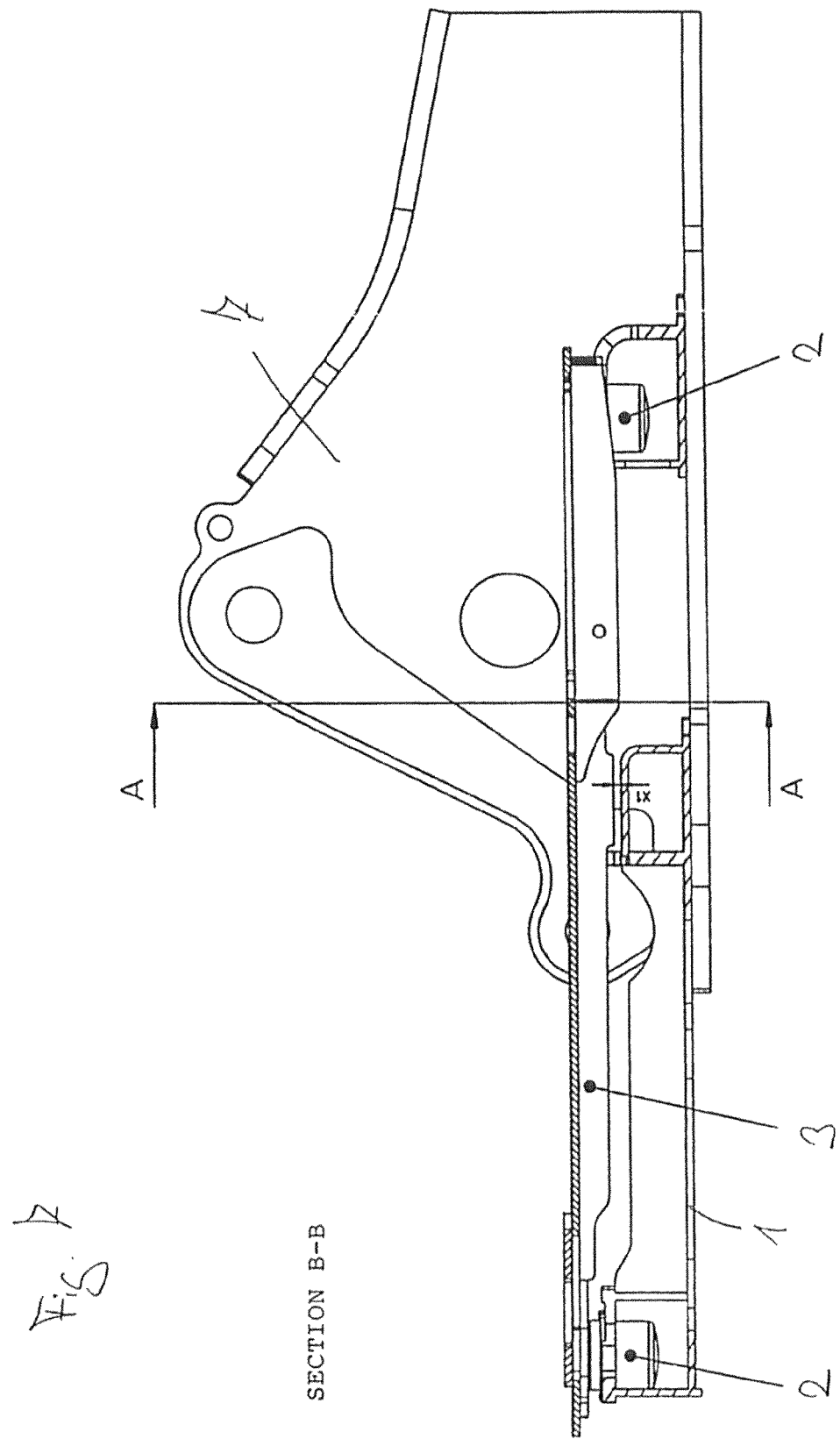

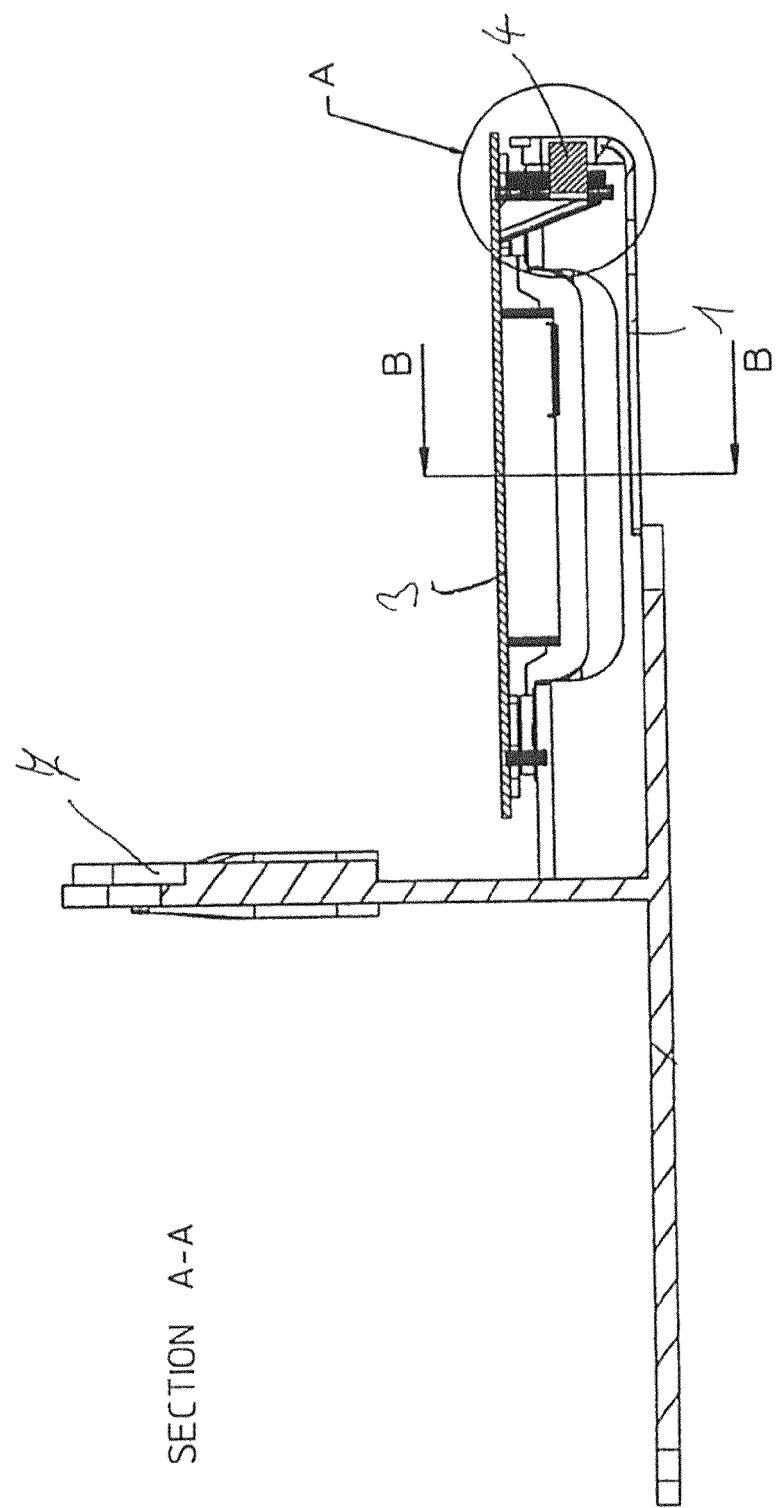

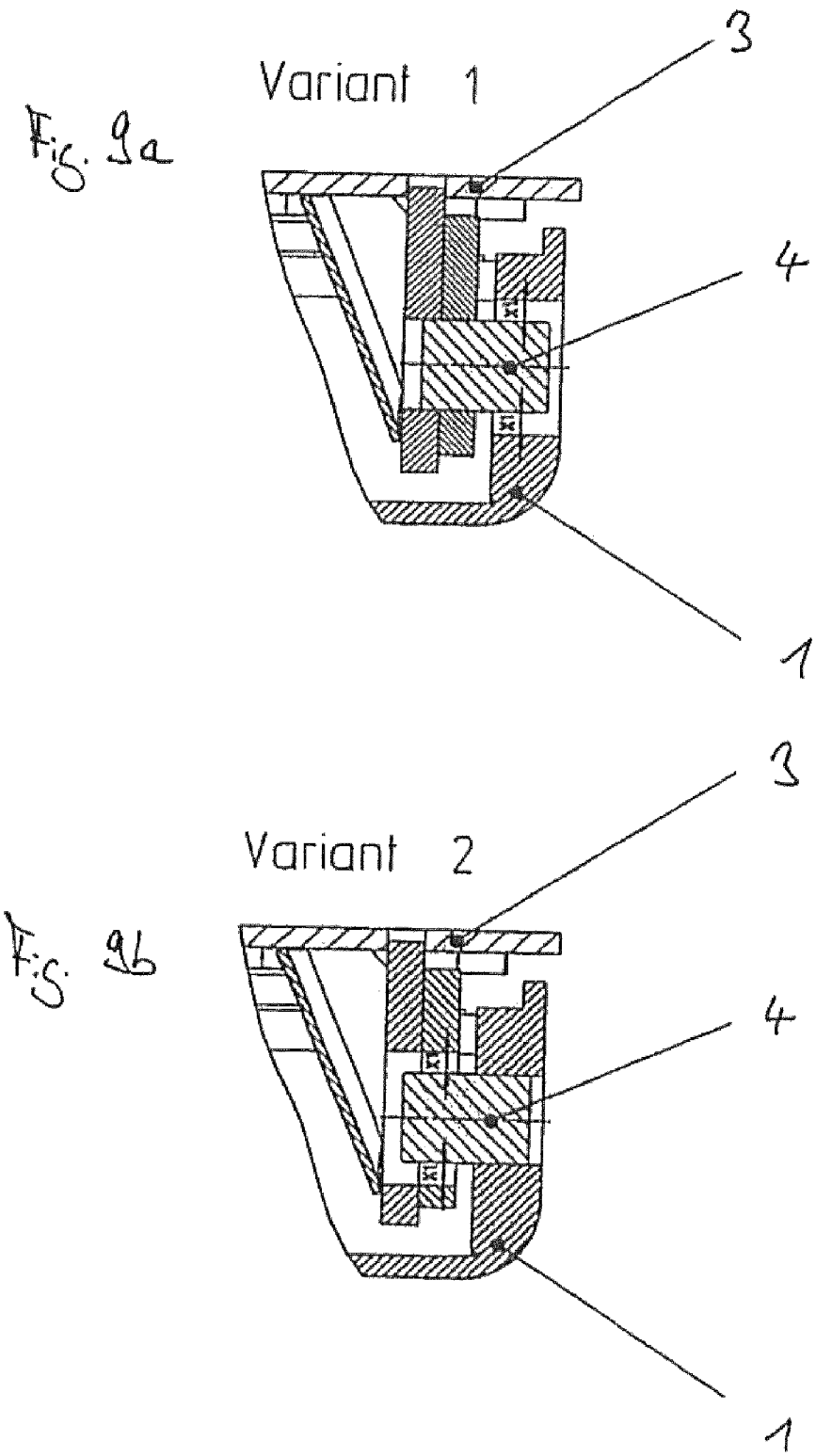

CONSTRUCTION MACHINE

BACKGROUND OF THE INVENTION

The present invention relates to a construction machine having an operator's cabin whose cabin structure which is made reinforced serves the protection of the operator, with the operator's cabin being supported via a base plate at an operator's cab frame at the machine side.

Due to safety regulations which are becoming more strict, it is increasingly becoming necessary to equip construction machines such as hydraulic excavators with rollover protection. This rollover protection is expediently integrated into the cabin structure in this respect, which is hereby made in reinforced form. Such a cabin with integrated rollover protection is in this respect usually supported elastically on the operator's cab frame to decouple it with respect to vibrations and is secured via securing elements against snapping on an excessive load such as occurs on an accident or on a tipping over of the construction vehicle. Such a rollover protection of a hydraulic excavator must in particular satisfy the ROPS demands, which can only be achieved in the prior art by very solidly made and so bulky and expensive individual components.

SUMMARY OF THE INVENTION

It is therefore the object of the present invention to provide a construction machine with integrated rollover protection by which the machine operator is ideally protected and in which nevertheless an economic solution is used.

This object is solved in accordance with the invention by a construction machine in accordance with the description herein. In the construction machine in accordance with the invention, the stiffness of the cabin structure is larger at least with respect to a lateral force engagement than that of the base plate and/or of the operator's cab frame so that the base plate and/or the operators cab frame first deform in the event of a load. The operator's cabin, the base plate and the operator's cab frame hereby form an integrated total system for the protection of the machine operator in the event of an accident. The complete system is in this respect used for the force reception in the event of an accident and protects the operator. Due to the setting in accordance with the invention of the stiffnesses of the individual components, it is ensured in this respect that the base plate and/or the operator's cab frame first destroy energy via their deformation and the cabin structure is only thereupon appreciably deformed. All the individual parts of the ROPS structure are thus loaded so that an economic total system is made possible. All the involved components thus in particular only take up so much energy as is necessary, with nevertheless a required minimum force being able to be introduced into the system. It is in this respect furthermore ensured by the stiffness of the cabin structure that the survival space defined in accordance with ISO 10262-2 for the machine operator is maintained and nevertheless sufficient energy is destroyed via the base plate and/or the operator's cab frame to protect the machine operator.

The cabin structure is advantageously only appreciably deformed in this respect on a lateral force engagement when the operator's cabin contacts the boom and/or the superstructure of the construction machinery. It is hereby ensured that initially as much energy as possible is introduced into the operator's cab frame without the operator's cabin being appreciably deformed. For this purpose, the arrangement of the operator's cab frame is selected such that the spacing between the operator's cabin and the equipment disposed next to it such as a boom or the superstructure of the construction machine is matched to the stiffness of the operator's cab frame and the operator's cabin such that initially the total energy which can be deflected via the deformation of the operator's cab frame is destroyed. The cabin structure hereby remains intact for as long as possible and thus ideally protects the machine operator. The operator's cab frame is in this respect designed to be sufficiently stiff for normal operation. It is of no significance in this respect whether the frame is screwed or welded to the superstructure.

Further advantageously in the construction machine in accordance with the invention, the side of the cabin structure facing the construction machinery is designed such that a stiffness crack occurs on a contact with the equipment and/or the superstructure of the construction machine. Sufficient energy can hereby be destroyed by the deformation of in particular the right hand pillars of the cabin structure, which signifies an additional protection for the operator. In this respect, the maximum possible deformation of the cabin is utilized; however, only when a maximum energy has been taken up by the operator's cab frame and the cabin already contacts the construction machine. It is simultaneously ensured that a sufficient survival space for the operator is maintained.

Further advantageously, the operator's cab frame and the cabin structure or base plate have force transmitting elements which are not in contact with one another in the normal case and which come into contact in the load case to transmit force from the cabin structure to the operator's cab frame. An effective vibration decoupling between the operator's cab frame and the cabin structure can thus be ensured in normal operation, whereas the force transmitting elements ensure in the event of an accident that the forces acting on the cabin structure are ideally transmitted to the operator's cab frame.

In this respect, the force transmitting elements are advantageously arranged at the side of the operator's cab frame and of the cabin structure or base plate remote from the construction machine. The forces which occur in the event of an accident and which usually engage at the operator's cabin from the side remote from the construction machine are thus ideally deflected to the operator's cab frame.

Further advantageously, the force transmitting elements are made of a rigid pin which engages into a rigid opening. A particularly simple and cost-effective option of force transmission hereby results. The size of the opening in comparison with the size of the rigid pin in this respect determines the play of the force transmitting elements in normal operation or the strength of the forces which are necessary so that the force transmitting elements engage at one another.

Further advantageously, the base plate of the operator's cabin is supported in accordance with the invention at the operator's cab frame via damping elements. They usually have an elastic element and provide a decoupling between the operator's cabin and the construction machine from a technical vibration aspect.

The damping elements in accordance with the invention advantageously have securities against being torn out. The securities against being torn out ensure that in the event of an overload the damping elements are not damaged and are not strained beyond their maximum permitted deformation path.

Advantageously, in this respect, the force transmitting elements in accordance with the invention only come into contact with one another in the load case when the deformation path of at least one damping element has been used up. It is hereby ensured that initially only the damping elements anyway present are used for the destruction of energy before forces are conducted directly from the cabin structure to the operator's cab frame.

Further advantageously, the stiffness of the cabin structure in accordance with the invention is at least designed with respect to a lateral force engagement such that an appreciable deformation of the cabin structure only occurs when the deformation path of at least one damping element has been consumed. It is in turn hereby ensured that the operator's cabin is only deformed when an energy absorption by the damping element is no longer possible.

Further advantageously, the stiffness of the cabin structure is higher in the rear region than in the front region. Good vision conditions can hereby be ensured in the front region by the use of relatively slim components, whereas the safety is ensured by the increased stiffness in the rear region.

Advantageously, in the construction machine in accordance with the invention, the stiffness of the cabin structure is further increased via an externally joined stiffening element. It is hereby possible to cover higher machine weights without having to intervene in the cabin structure.

Advantageously, the stiffening element is arranged in this respect in the rear region of the cabin structure. The energy absorption is thus concentrated on the rear pillars of the joined component, whereas a sufficient stiffness in the joined component is also achieved without pillars in the front region.

BRIEF DESCRIPTION OF THE DRAWINGS

The present invention will now be explained in more detail with reference to an embodiment and to the drawings.

There are shown.

FIG. 2 a side view of the construction machine in accordance with the invention with the safety structure in accordance with the invention;

FIG. 6 a side view of the operator's cabin in accordance with the invention;

FIG. 7 a sectional view along a longitudinal axis of the operator's cab frame in accordance with the invention with a base plate;

FIG. 8 a sectional view along a transverse axis of the operator's cab frame in accordance with the invention with a base plate;

FIG. 9a a first embodiment of the force transmitting elements in accordance with the invention; and FIG. 9b a second embodiment of the force transmitting elements in accordance with the invention.

DESCRIPTION OF THE PREFERRED EMBODIMENTS

Figure 1:
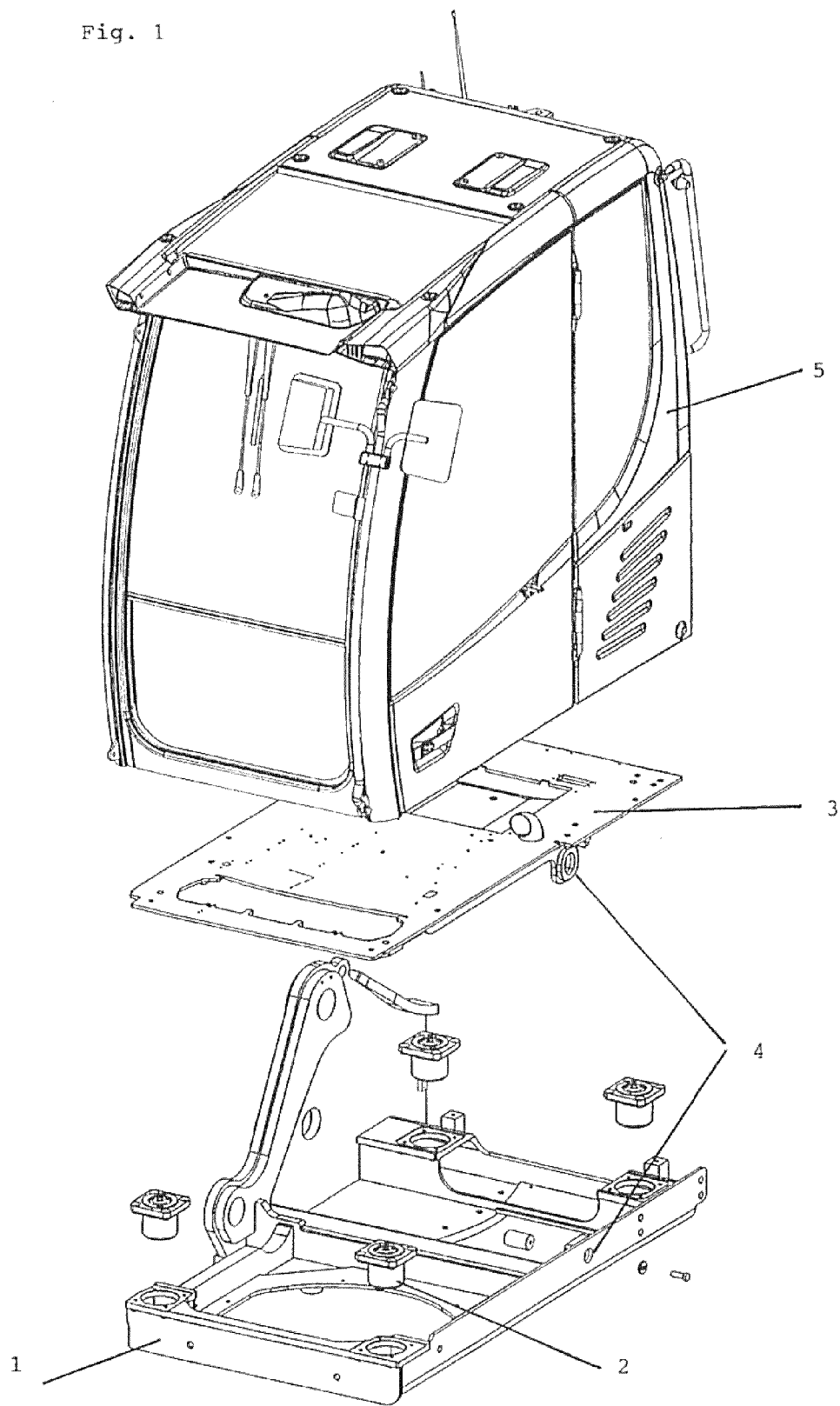
FIG. 1 a perspective view of the safety structure in accordance with the invention.

FIG. 1 shows a perspective view of the ROPS system in accordance with the invention which represents an integrated total system for the protection of the machine operator in the event of an accident. It comprises an operator's cab frame 1 at the machine side on which the base plate 3 of the operator's cabin 5 is supported via damping elements 2. Furthermore, force transmitting elements 4 are provided which allow an ideal force transmission between the affected components in the event of an accident. The rollover protection is in this respect integrated into the operator's cabin 5 and is ensured by the cabin structure in the interaction between the base plate and the operator's cab frame.

The components are designed and arranged in this respect such that the damping against vibrations takes place by the damping elements 2 in normal use, but in the event of unforeseen situations such as an accident, the complete system comes into effect. It is ensured in this respect that the survival space for the machine operator in accordance with ISO 10262-2 is maintained and still the maximum possible deformation of the components involved in the safety system is used to be able to destroy sufficient energy.

Figure 4:
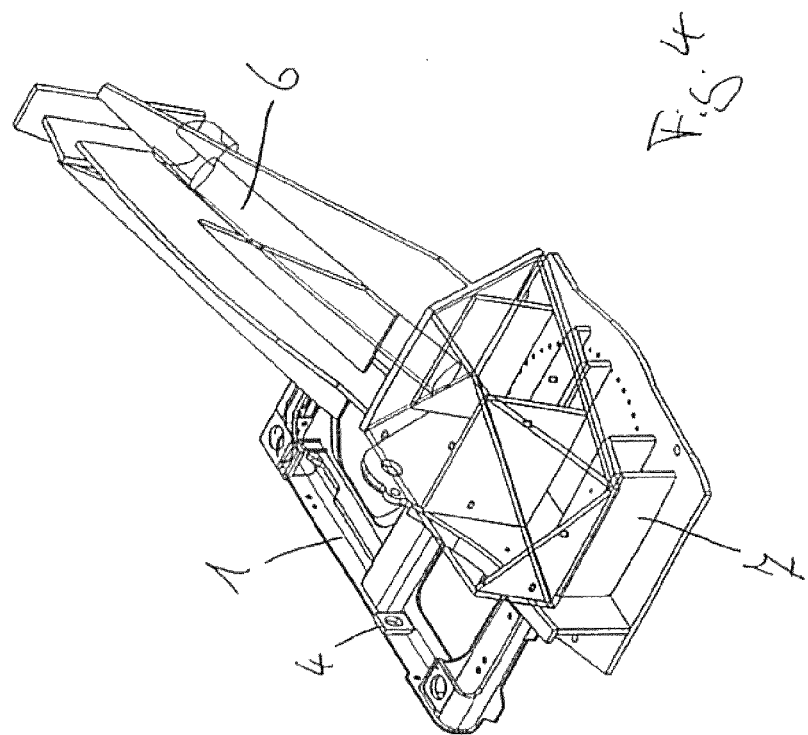
FIG. 4 a perspective view of the construction machine in accordance with the invention with the operator's cab frame in accordance with the invention.
Figure 3:
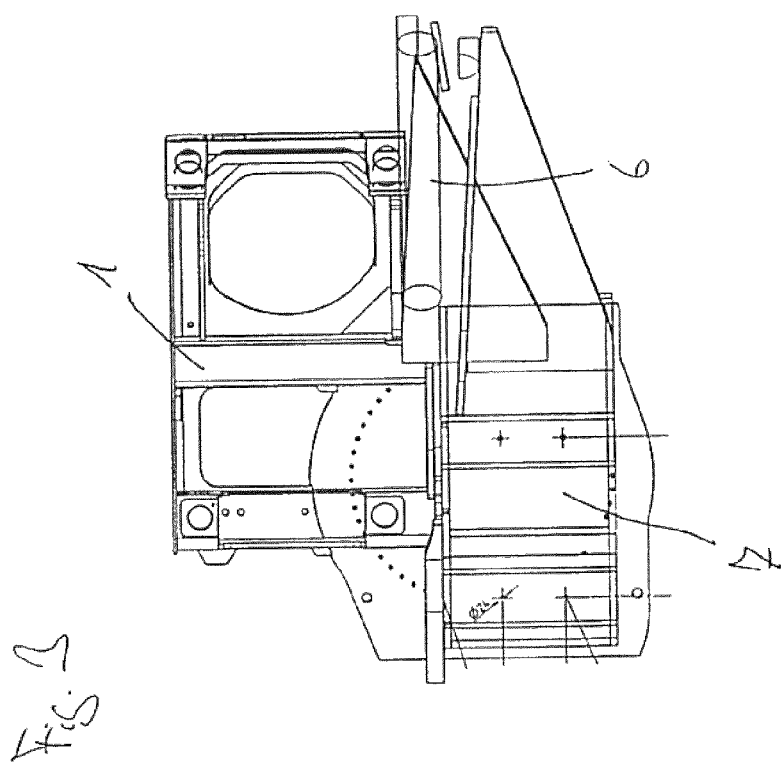
FIG. 3 a plan view of the construction machine in accordance with the invention with the operator's cab frame in accordance with the invention.

FIGS. 2 to 4 in this respect show the arrangement of the operator's cabin 5 or of the operator's cab frame 1 at the superstructure 7 of the construction machine in accordance with the invention, with the embodiment being a hydraulic excavator. In this respect the boom 6 is pivotally connected to the superstructure 7 beside the operator's cabin 5 or the operator's cab frame 1. In this respect, the arrangement of the operator's cab frame 1 is selected such that the spacing between the operator % cabin 5 and the equipment 6 disposed to the right thereof or the superstructure 7 is matched to the stiffness of the operator's cabin 5 and the operator's cab frame 1 such that initially a maximum of energy is introduced into the frame without appreciably deforming the cabin. It is hereby ensured that the survival space for the operator on the rollover is maintained for as long as possible and nevertheless sufficient energy can be destroyed for the protection of the machine operator.

The cabin structure is in particular configured in this respect such that its stiffness on lateral loading is higher than that of the operator's cab frame in conjunction with the base plate and the elastic bearings so that the operator's cab frame 1, the base plate 3 and the elastic bearings 2 are ideally involved in the energy reception. The cabin structure thus only starts to be appreciably deformed when an energy absorption by the operator's cab frame 1, the base plate 3 or the elastic bearings 2 is no longer possible. This is the case when the cabin structure comes into contact with the boom 6 of the machine and/or with the steel construction of the superstructure 7. As a result of this, the energy absorption is concentrated in the structure of the operator's cabin which is in turn designed such that the deformation is as low as possible to ensure sufficient protection for the operator if the machine remains on the roof after a rollover. The cabin structure is in this respect in particular designed such that the survival space for the operator is also maintained after a rollover of the machine when the machine remains on the roof.

Figure 5:
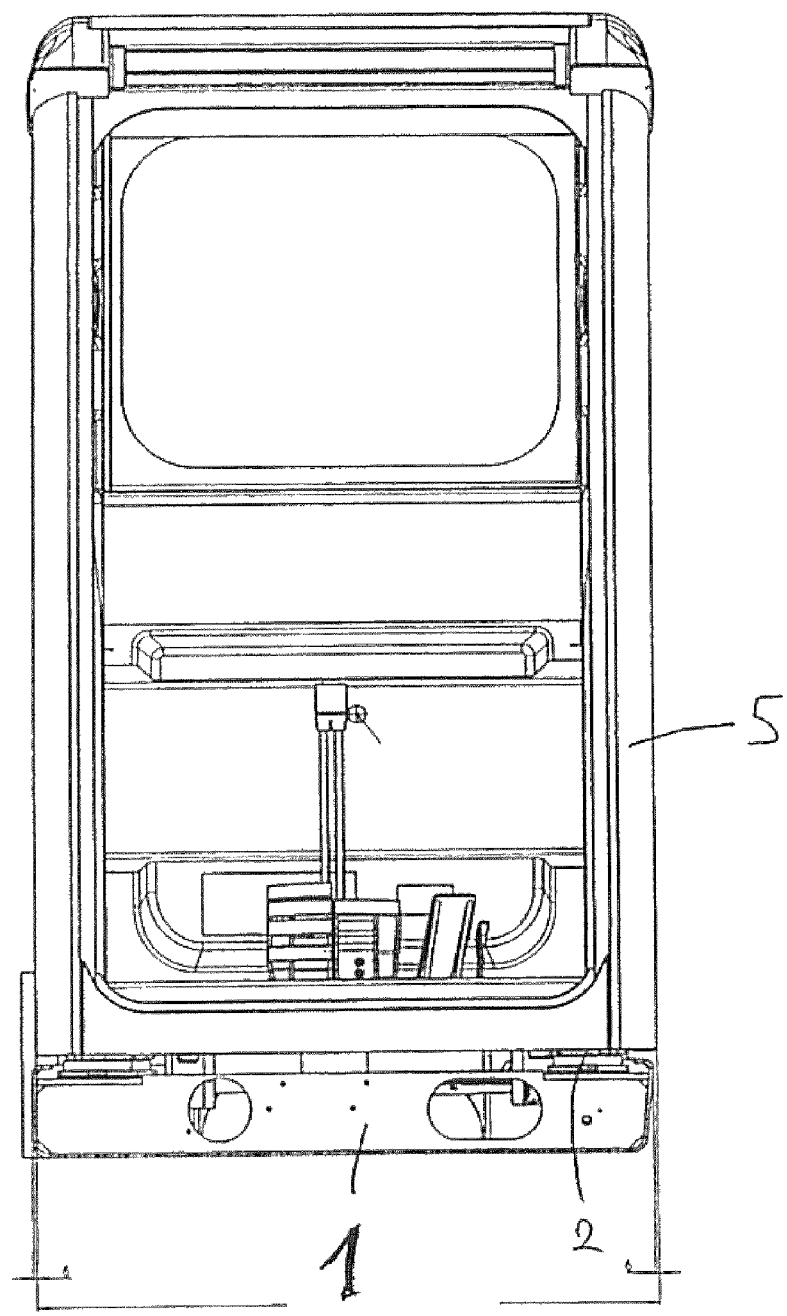
FIG. 5 a frontal view of the operator's cabin in accordance with the invention.

The operator's cabin 5 is shown in more detail in FIGS. 5 and 6. The cabin structure in this respect includes a frame of front and rear pillars as well as top elements, with the stiffness in the rear region being selected to be so large that the front region ensures good vision conditions due to relatively slim components.

In this respect, the pillars of the cabin structure facing the construction machine are configured such that a stiffness crack occurs on a contact with the equipment or with the superstructure of the construction machine. Energy can hereby be continued to be destroyed by the deformation of the pillars of the cabin structure if an energy absorption can no longer take place via the operator's cab frame.

As is in particular shown in the enlarged details in FIG. 6, the base plate 3 is supported at the operator's cabin frame via damping elements 2. The elastic bearings in this respect have an integrated security against being torn out, with the tear-out forces being higher than the system-induced maximum forces.

FIGS. 7 and 8 again show the safety system of operator's cab frame 1 and base plate 3 which are connected to one another by the damping elements 2. As can in particular be recognized in FIG. 8 and in the enlarged representation in FIG. 9a, the base plate 3 and the operator's cab frame 1 have force transmitting elements 4 in this respect. The force transmitting elements 4 serve as catches for the operator's cab frame after the elastic deformation path, in particular of the rear left hand bearing, has been consumed. In this respect, the cabin structure is configured such that the energy introduced up to the maximum deformation of the rear left hand bearing and thus the force-transmitting connection between the force transmitting elements 4 does not yet result in an appreciable deformation of the cabin structure. The deformation of the cabin structure only occurs when a limit load of the rear left hand bearing is achieved and thus the maximum possible energy has been absorbed by the damping elements 2.

The force transmitting elements 4 are in this respect made as rigid components which have a vertical spacing X1 from one another in normal operation and thus ensure the free vertical movability between the base plate 3 and the operator's cab frame 1 in normal operation. In the event of an accident, the force transmitting elements 4 in contrast come into contact with one another and so enable forces and torques to be transmitted from the operator's cabin 5 to the operator's cab frame 1 on the vehicle side. An optimum force flow is hereby enabled in the affected components. The force transmission elements 4 in this respect include a pin which engages into an elongate opening at a certain vertical spacing.

In the variant shown in FIG. 9a, the pin is in this respect arranged at the base plate 3; the opening, in contrast, is arranged at the operator's cab frame 1. The second variant shown in FIG. 9b, in contrast, shows the reverse arrangement in which the pin is arranged at the operator's cab frame 1, the opening at the base plate 3.

The pin in this respect extends along a horizontal axis so that a vertical spacing results between the outer surface of the pin and the opening. A certain vertical play is hereby given between the operator's cabin and the operator's cab frame 1 in normal operation, with the spacing between the pin and the opening defining the point in interaction with the deformability of the damping elements 2 at which, in the event of an accident, a contact of the force transmitting elements is established and a direct force transmission takes place via the force transmitting elements.

All involved components of the ROPS structure are loaded by this stepped force reception via the damping elements, the base plate and the operator's cab frame, and finally the cabin structure, so that an economic total system becomes possible with which the operator can nevertheless be ideally protected.

The invention claimed is:

1. A construction machine having an operator's cabin (5) having a reinforced cabin structure for protection of the operator, with the operator's cabin (5) being supported via a base plate (3) on an operator's cab frame (1) at the machine side, wherein
    the stiffness or strength of the cabin structure is larger than the base plate (3) and/or operator's cab frame (1) at least with respect to a lateral force application, such that on a load application, the base plate (3) and/or operator's cab frame (1) deform first, and
    the operator's cab frame (1), cabin structure or base plate (3) have force-transmitting elements (4) arranged out of contact in a normal operation and in a loading condition, come into contact to transmit force from the cabin structure to the operator's cab frame (1).

2. A construction machine in accordance with claim 1, wherein the cabin structure is only appreciably deformed on a lateral force engagement when the operators cabin contacts a boom and/or superstructure of the construction machine.

3. A construction machine in accordance with claim 1, wherein a side of the cabin structure directed toward the construction machine is designed such that sudden increase in strength occurs on a contact with equipment and/or a superstructure of the construction machine.

4. A construction machine in accordance with claim 1, wherein the force transmitting elements are arranged at a side of the operator's cab frame and the cabin structure or base plate directed away from the construction machine.

5. A construction machine in accordance with claim 1, wherein the force transmitting elements comprise a rigid pin which engages into a rigid opening.

6. A construction machine in accordance with claim 1, wherein the base plate is supported at the operator's cab frame via damping elements.

7. A construction machine in accordance with claim 6, wherein the damping elements have securities against being torn out.

8. A construction machine in accordance with claim 1, wherein the base plate is supported at the operator's cab frame via damping elements, and the force transmitting elements only come into contact in the load case when the deformation path of at least one damping element has been consumed.

9. A construction machine in accordance with claim 6, wherein the stiffness of the cabin structure is designed at least with respect to a lateral force engagement such that an appreciable deformation of the cabin structure only occurs when the deformation path of at least one damping element has been consumed.

10. A construction machine in accordance with claim 1, wherein the stiffness in a rear region of the cabin structure is higher than in a front region.

11. A construction machine in accordance with claim 1, wherein the force-transmitting elements (4) are mounted on one of the base plate (3) or cab frame (1) and spaced (xi) from the other of the base plate (3) or cab frame (1) in the normal operation to permit free mobility between the base plate (3) and cab frame (1) in the normal operation, and
    in the loading condition, contact either the base plate (3) or cab frame (1) initially spaced (xi) therefrom to transmit the force from the cabin structure to the operator's cab frame (1).

12. A construction machine in accordance with claim 11, wherein the force transmission elements (4) are formed as pins (4) each extending horizontally in a respective opening provided in the base plate (3) or cab frame (1) such that each pin (4) is vertically-spaced (xi) between an outer surface of the pin (4) and an inner surface of an opening receiving the pin (4) in the base plate (3) or cab frame (1) in the normal operation to ensure free vertical mobility between the base plate (3) and cab frame (1) in the normal operation.

13. A construction machine in accordance with claim 12, wherein the pin (4) is mounted on the base plate (3) and extends into an opening provided in the cab frame (1).

14. A construction machine in accordance with claim 12, wherein the pin (4) is mounted on the cab frame (1) and extends into an opening provided in the base plate (3).

* * * * *